United States Patent [19]
Kai et al.

[11] Patent Number: 5,527,064
[45] Date of Patent: Jun. 18, 1996

[54] INFLATABLE AIR BAG SYSTEM

[75] Inventors: Takeshi Kai; Toshihiko Okazaki; Minoru Kanda; Toshiya Sakai; Akihiro Ikeya, all of Saitama-ken, Japan

[73] Assignee: Honda Giken Kogyo Kabushiki Kaisha, Tokyo, Japan

[21] Appl. No.: 350,988

[22] Filed: Nov. 29, 1994

[30] Foreign Application Priority Data

Jan. 28, 1994 [JP] Japan .................... 6-026338

[51] Int. Cl.$^6$ .................................. B06R 21/16
[52] U.S. Cl. ......................... 280/728.2; 280/732
[58] Field of Search .................. 280/728.2, 728.3, 280/732

[56] References Cited

U.S. PATENT DOCUMENTS

| | | | |
|---|---|---|---|
| 4,989,897 | 2/1991 | Takada | 280/728.3 |
| 5,167,427 | 12/1992 | Baba | 280/728.3 |
| 5,217,253 | 6/1993 | Pray | 280/728.2 |
| 5,275,432 | 1/1994 | Pray et al. | 280/728.2 |
| 5,303,951 | 4/1994 | Goestekors et al. | 280/728.3 |

*Primary Examiner*—Kenneth R. Rice
*Attorney, Agent, or Firm*—Armstrong, Westerman, Hattori, McLeland & Naughton

[57] ABSTRACT

In an inflatable air bag system for restraining a vehicle occupant in case of a high acceleration situation such as a vehicle crash comprising a casing accommodating a folded air bag therein, the casing is adapted to be installed into an opening of an instrument panel facing the vehicle occupant. The casing is relatively securely attached to the vehicle body at its lower end, but is simply secured to the instrument panel at its upper end by means of a slot and projection engagement structure which is adapted to be engaged as a result of fully inserting the casing in the opening. Thus, the work involved in installing the air bag system is simplified, but the casing is secured in a sufficiently stable fashion because the slot and projection engagement structure is highly effective in restraining the rotating movement of the casing around its fixedly secured lower end. In use, this structure allows the casing to be securely supported against the reaction caused by the deployment of the air bag.

10 Claims, 4 Drawing Sheets

INFLATABLE AIR BAG SYSTEM

TECHNICAL FIELD

The present invention relates to an inflatable air bag system for restraining a vehicle occupant in case of a high acceleration situation, such as a vehicle crash.

BACKGROUND OF THE INVENTION

An increasingly large number of automobiles are equipped with a passive restraint system which employs an inflatable air bag in case of a vehicle crash by detecting a large acceleration or deceleration of the vehicle. Such an inflatable bag is normally installed inside a central part of a steering wheel for protecting the vehicle operator. To protect the vehicle occupant sitting next to the vehicle operator, an inflatable bag is normally installed inside a part of the instrument panel opposing the vehicle occupant.

An air bag system adapted to be installed in an instrument panel normally includes a casing extending laterally and having a certain depth. The inner or lower end of the casing is securely attached to a part of the vehicle body panel, such as a stiffener, and the upper surface of the casing is designed so as to be flush with the surrounding surface of the instrument panel. When the air bag is deployed, the resulting reaction will produce a torque which tends to turn the air bag casing around the lower end of the casing. Therefore, it is necessary to secure the upper end of the casing to prevent an undesirable movement of the casing.

It is conceivable to provide a bracket adjacent to the upper end of the casing, and securely attach the upper end of the casing by using threaded bolts or other fastening means. However, it will increase, not only the material cost, but also the amount of work required for the assembly work.

BRIEF SUMMARY OF THE INVENTION

In view of such problems of the prior art, a primary object of the present invention is to provide an inflatable air bag system which can be securely attached to the instrument panel of a vehicle in a simple manner.

A second object of the present invention is to provide an inflatable air bag system which can be mounted in the instrument panel of a vehicle in an accurate manner so that an upper surface may be made to conform to the surrounding contour of the instrument panel without any substantial difficulty.

A third object of the present invention is to provide an inflatable air bag system which can be easily and economically mounted on the instrument panel of a vehicle.

A fourth object of the present invention is to provide an inflatable air bag system which can be securely mounted so that the air bag may be deployed without damaging the surrounding part of the instrument panel.

A fifth object of the present invention is to provide an inflatable air bag system which can be securely mounted so that the air bag may be deployed in a highly stable fashion.

According to the present invention, these and other objects can be accomplished by providing an inflatable air bag system for restraining a vehicle occupant in case of a high acceleration situation comprising a casing accommodating a folded air bag therein, the casing being adapted to be installed into an opening of a panel facing the vehicle occupant, wherein: the casing comprises a stay structure for substantially fixedly securing a lower part of the casing to a part of a vehicle body, and a slot and projection engagement structure provided in an upper part of the casing for cooperation with an edge portion of the opening of the panel to restrain a rotational movement of the casing around the lower part of the casing, the slot and projection engagement structure being adapted to be engaged as a result of fully inserting the casing in the opening.

Thus, the upper part of the casing can be secured simply by fitting the casing into the opening of the panel without requiring any fastening means. By securing the upper part of the casing in this fashion, it is possible to prevent any damage from being done to the instrument panel when the air bag is deployed, and to allow the air bag to be deployed in a highly stable manner.

Typically, the casing is laterally elongated, and the slot and projection engagement structure is provided in a middle part of each lateral side of the upper part of the casing. Such an air bag system is suitable for use in restraining a vehicle occupant sitting next to the vehicle operator, and a vehicle occupant sitting in a rear seat of a passenger car, a bus or a passenger vehicle.

According to a preferred embodiment of the present invention, the upper part of the casing is provided with a plurality of resilient leg pieces adapted to be engaged by a peripheral edge of the opening of the panel for allowing an upper part of the casing to be snap fitted into the opening of the panel. Preferably, an upper part of the casing is provided with an external peripheral flange, and the leg pieces depend from a lower surface of the flange. The snap engagement in the upper part of the casing is highly effective in stabilizing the casing without increasing the effort required for installing the air bag system.

When the casing is provided with such a flange, the peripheral edge of the opening of the panel is preferably recessed so as to present a flush surface when the casing is installed in the opening, and the flange is received in the recessed peripheral edge.

The slot and projection engagement structure can be achieved in a number of fashions. For instance, the peripheral edge of the opening may be provided with a plurality of notches each for receiving a corresponding one of the resilient leg pieces. Conversely, the peripheral edge of the opening may be provided with a plurality of projections each for engagement with a recess provided in a corresponding one of the resilient leg pieces.

The recess may be provided in the leg piece in a number of different ways. For instance, the resilient leg piece may be U-shaped, and the recess may be defined by a gap between two prongs of the U-shaped leg piece. Alternatively, the resilient leg piece may be bifurcated, and the recess may defined by a gap between two prongs of the bifurcated leg piece.

According to yet another embodiment of the present invention, an annular rib depends from a lower surface of the flange so as to surround the casing, and a plurality of parts of the annular rib extend laterally so as to define projections which fit into associated notches provided in the peripheral edge of the opening of the panel to form the slot and projection engagement structure. The annular rib may also serve as a stiffener for the flange or the upper end of the casing.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
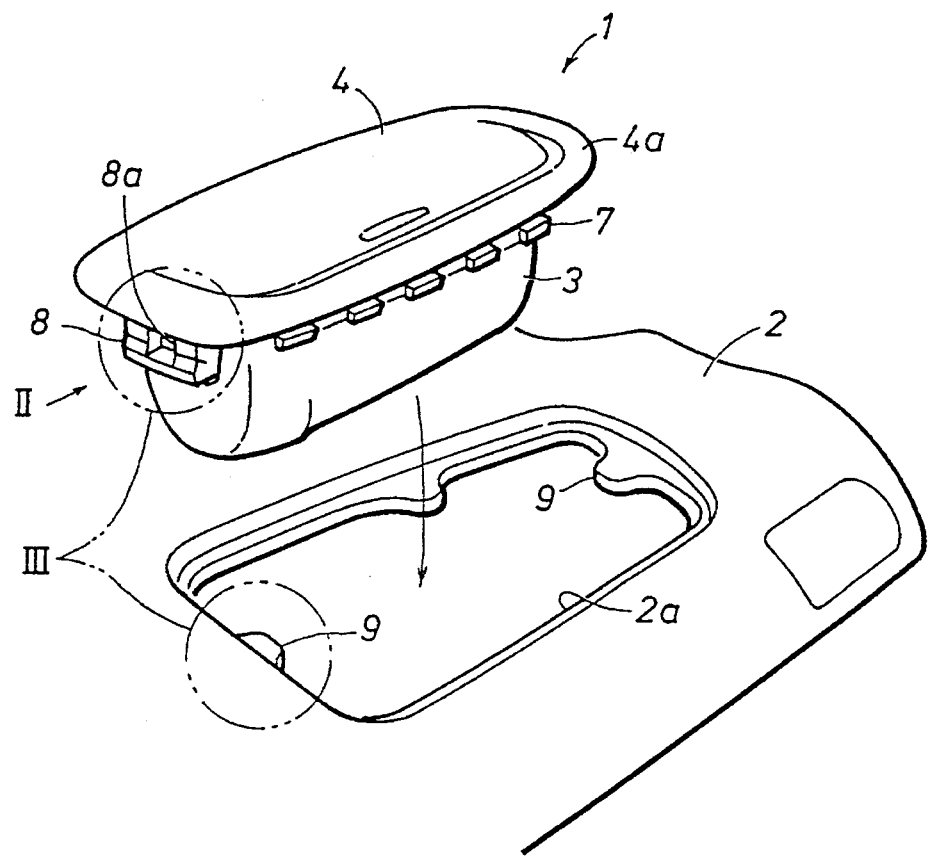
FIG. 1 is an exploded perspective view of a first embodiment of the inflatable air bag system according to the present invention.
Figure 2:
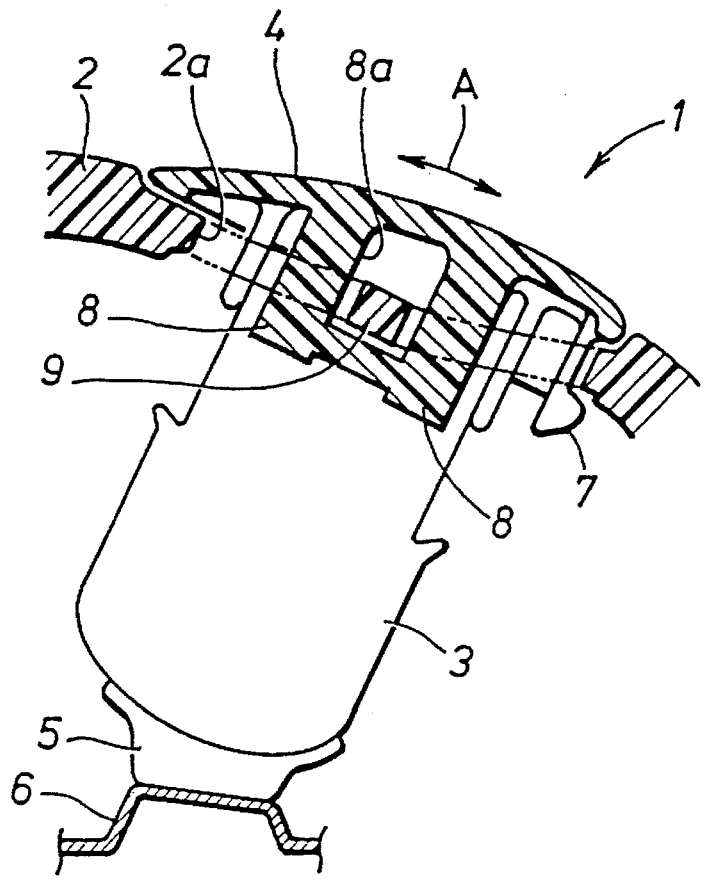
FIG. 2 is a sectional view of the part indicated by arrow II of FIG. 1 when the casing is fully fitted into the opening of the instrument panel.
Figure 3:
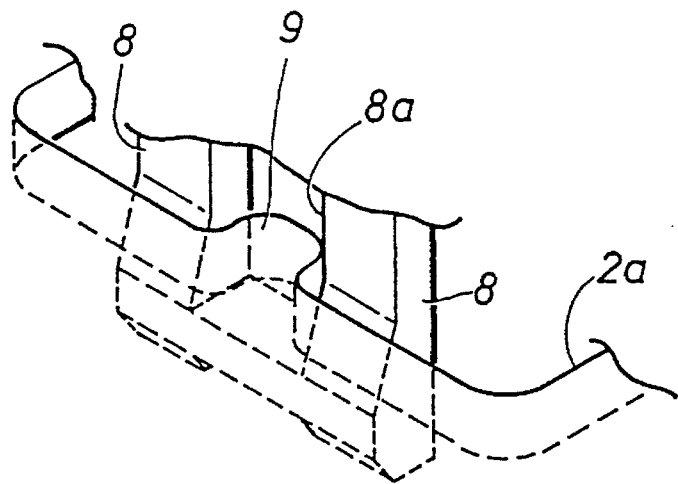
FIG. 3 is an enlarge perspective view of the part of the inflatable air bag system indicated by circles III of FIG. 1.

FIGS. 1 through 3 show a first preferred embodiment of the inflatable air bag system according to the present invention. This air bag system is adapted to restrain the vehicle occupant sitting next to the vehicle operator in case of a vehicle crash or other high acceleration situation by deploying an inflated air bag in front of this vehicle occupant. This air bag system comprises an air bag module 1 which accommodates a folded air bag (not shown in the drawings) and is adapted to be mounted in a part of an instrument panel 2 which extends substantially horizontally or has a downward inclination toward the vehicle occupant. This inclination may range between zero and 90 degrees. However, it should be noted that the present invention is applicable to other applications such as the rear seats of passenger cars, and the passenger seats of buses and other vehicles as long as each air bag module is installed in an instrument panel like structure located in front of the vehicle occupant.

The air bag module 1 comprises a casing 3 having a box-like structure which is laterally elongated and has a certain depth, as best illustrated in FIG. 1. This casing 3 receives the air bag therein and is provided with an opening at its upper end for ejecting the air bag as it is deployed. The casing 3 is further provided with a lid member 4 integrally formed with the upper end of the casing 3 so as to close the upper opening of the casing 3, and a bracket 5 (FIG. 2) integrally formed at a lower end of the casing 3 for securing the lower part of the casing 3 to a stiffener 6 of a body panel with threaded bolts or other fastening means not shown in the drawing.

The lid member 4 is formed with an external flange 4a extending from the upper end of the side wall of the casing 3 over its entire periphery. The instrument panel 2 is provided with an opening 2a for receiving the air bag module 1, and the flange 4a rests on the upper surface of the part of the instrument panel 2 surrounding the opening 2a when the air bag module 1 is fitted into this opening 2a. The surface of the part of the instrument panel 2 surrounding the opening 2a is slightly recessed from the surrounding surface so that the upper surface of the air bag module 1 is flush with the surrounding surface of the instrument panel 2 when the air bag module 1 is installed in the instrument panel 2.

A plurality of resilient leg pieces 7 integrally depend from the front and rear flanges of the lid member 4, and a free end of each of these leg pieces 7 is provided with a projection on an outer surface thereof so that the upper end of the casing 3 may be snap fitted into the opening 2a by the cooperation of these resilient leg pieces 7 and the edge of the opening 2a.

A U-shaped resilient leg piece 8 integrally depends from an intermediate part of each of the lateral flanges of the lid member 4a. The nexus at the bottom end of the U-shaped resilient leg piece 8 is provided with an external projection which is adapted to be engaged by the associated edge of the opening 2a when the air bag module 1 is fitted into the opening 2a. The associated edge of the opening 2a is provided with a projection 9 which is adapted to be fitted into an opening or a recess 8a defined between the two prongs of the U-shaped resilient leg piece 8 when the air bag module 1 is fitted into the opening 2a.

Such a slot and projection engagement structure is preferably provided on each of the side edges of the opening 2a. But it may be also either additionally or alternatively provided on each of the front and rear edges of the opening 2a.

When installing the air bag module 1 into the instrument panel 2, the bottom end of the casing 3 is fitted into the instrument panel 2 from the opening 2a, and the lid 4 is snap fitted into the opening 2a by deflecting the leg pieces 7 and 8 toward the casing 3. At the same time, the projections 9 are received by the recesses 8a of the leg pieces 8 with a certain amount of play so that the upper part of the casing 3 is secured with a certain amount of resiliency instead of being rigidly secured.

Therefore, when the air bag is deployed, the resulting reaction produces a torque which tends to rotate the casing 3 around the bracket 5 secured to the stiffener 6 in the direction indicated by arrow A in FIG. 2, and the engagement between the projections 9 and the recesses 8a of the leg pieces 8 effectively prevent excessive rotational movement of the casing 3. Because the upper end of the casing 3 is secured in this stable fashion, the possibility of damaging the air bag when it is being deployed can be eliminated, and the damage to the instrument panel 2 can be likewise avoided. By appropriately adjusting the dimensions of the projections 9 and the recesses 8a, it is possible to achieve a best result for each different combination of materials and configurations of the instrument panel 2. Because the leg pieces 7 and 8 can be integrally formed with the lid member 4 and the projection 9 can be also integrally formed with the instrument panel 2, the need for any external fastening means can be eliminated.

Figure 4:
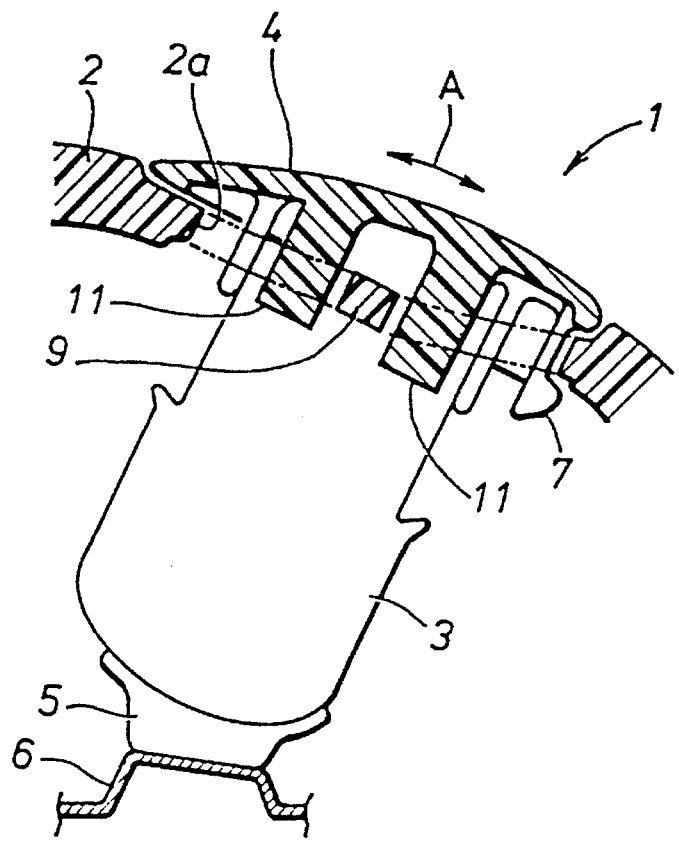
FIG. 4 is a view similar to FIG. 2 showing a second embodiment of the present invention.
Figure 5:
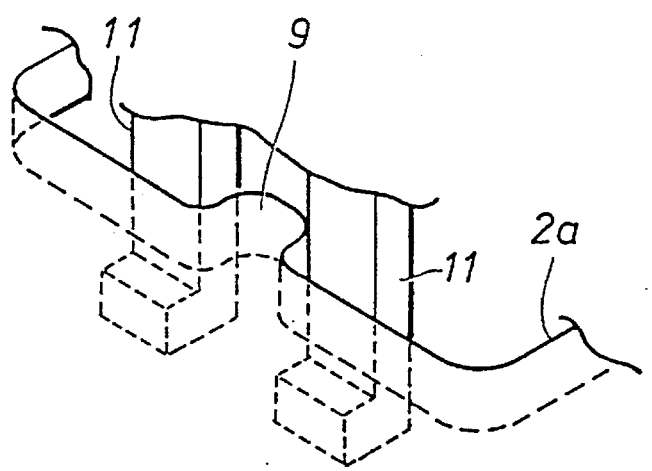
FIG. 5 is a view similar to FIG. 3 showing the second embodiment of the present invention.

FIGS. 4 and 5 show a second embodiment of the inflatable air bag system according to the present invention, and the various parts of this embodiment corresponding to those of the previous embodiment are denoted with like numerals. In this embodiment, instead of the U-shaped leg pieces of the previous embodiment, a bifurcated leg piece 11 depends from the lower surface of a middle part of each lateral fringe of the lid member 4. Each of the bifurcated lower ends of the leg pieces 11 is bent outwardly into the shape of letter-L as best illustrated in FIG. 5 so that these leg pieces 11 can also be resiliently engaged by the edge of the opening 2a. A projection 9 provided on each lateral edge of the opening 2a likewise fits into the gap between the bifurcated prongs of the corresponding leg piece 11, and this engagement secures the upper end of the casing 2 against the rotational movement in the direction indicated by arrow A in FIG. 4 when the air bag is deployed.

Figure 6:
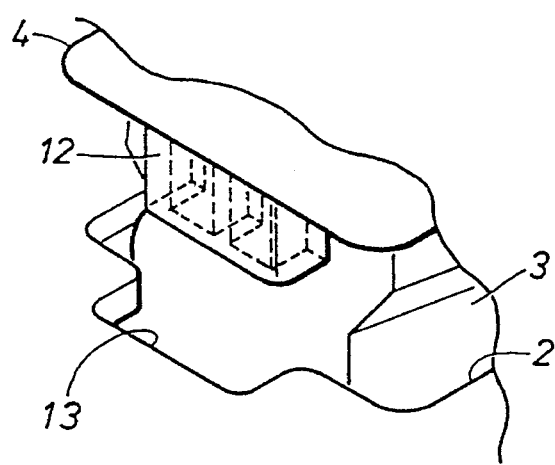
FIG. 6 is a view similar to FIG. 3 showing a third embodiment of the present invention.

FIGS. 6 shows a third embodiment of the inflatable air bag system according to the present invention, and the various parts of this embodiment corresponding to those of the previous embodiments are also denoted with like numerals. In this embodiment, a projection 12 is provided on each lateral side end the casing 2, and a corresponding notch 13 is provided on each lateral side edge of the opening 2a. Thus, the placement of the projection and the notch or the slot is reversed, but a similar result can be obtained. As shown by the dotted lines, the projections 12 may be hollow inside.

Figure 7:
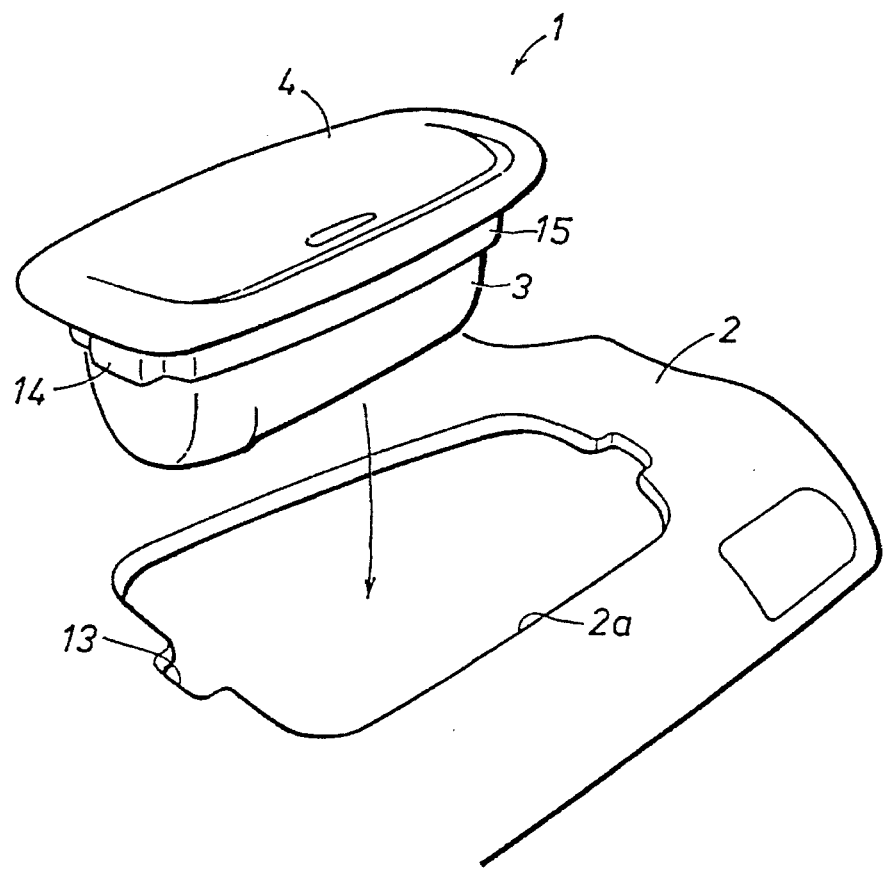
FIG. 7 is a view similar to FIG. 1 showing a fourth embodiment of the present invention.
Figure 8:
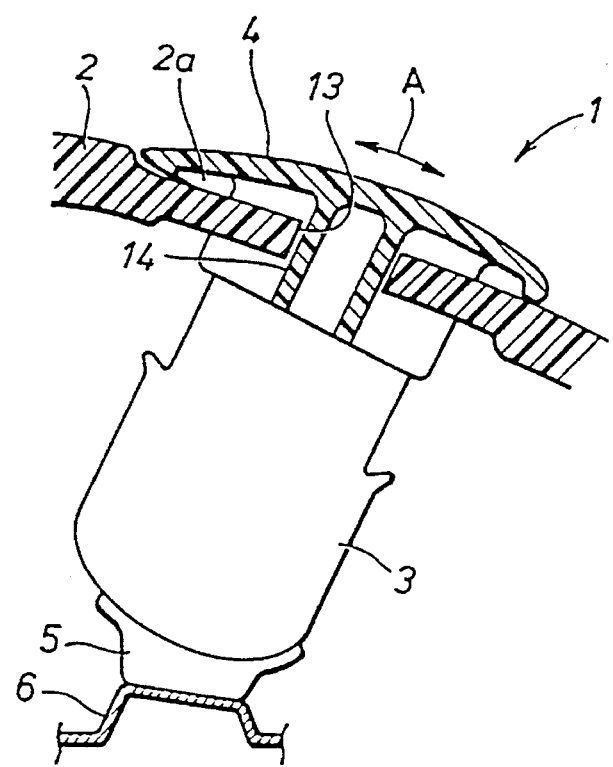
FIG. 8 is a view similar to FIG. 2 showing the fourth embodiment of the present invention.

FIGS. 7 and 8 show a fourth embodiment of the inflatable air bag system according to the present invention, and the various parts of this embodiment corresponding to those of the previous embodiments are also denoted with like numerals. In this embodiment, a notch 13 is provided on each lateral side edge of the opening 2a, and a corresponding projection 14 is provided on each lateral side of the casing 2 in the same way as in the third embodiment. The lower surface of the lid member 4 is integrally provided with an annular rib 15 over an entire circumference thereof so as to be conformal to the opening 2a. The projections 14 are provided on the outer surface of this annular rib 15. Each of the projections 14 may be internally hollow, for instance by forming each projection by suitably bending the annular rib 15 and integrally molding with the annular rib 15.

In this embodiment also, because the projections 14 are engaged by the notches 13 when the air bag module is installed in the instrument panel 2, the casing 2 can be secured against the torque produced by the reaction of the air bag as it is deployed. If desired, the lid member 4 may be made of a relatively soft material. Then, it is possible to prevent any damage to be done to the material of the instrument panel 2.

According to the present invention, during the assembly work, the upper end of the air bag module 1 may be simply fitted into the opening 2a of the instrument panel 2, and no effort is required to complete the process of installation. Furthermore, no fastening means is required to secure the upper part of the casing. Even though the assembly work is simplified in this fashion, because the upper part of the casing is secured effectively against the reaction produced by the deployment of an air bag, a reliable operation can be ensured, and the damage to the instrument panel can be avoided.

Although the present invention has been described in terms of specific embodiments, it is possible to modify and alter details thereof without departing from the spirit of the present invention.

What we claim is:

1. An inflatable air bag system installed in a panel for restraining a vehicle occupant in case of a high acceleration comprising, in combination:

an opening having a peripheral edge in said panel facing said vehicle occupant, a casing accommodating a folded air bag therein disposed in said panel through the opening therein, a stay structure substantially fixedly securing said casing at a lower part thereof, a rim for closing said opening including a peripheral flange portion adapted to overlie said peripheral edge about at least a substantial portion of said opening, at least one resilient leg depending from said flange portion of said rim; and means forming a cooperating slot and projection engagement structure for restraining rotational movement between said casing and said panel, said engagement structure including a projection formed in either one of said edge of said opening and said resilient leg and a slot formed in the other of said edge of said opening and said resilient leg, said slot and said projection being mutually engagable to provide a laterally rigid obstruction against rotational movement between said casing and said panel.

2. An inflatable air bag system according to claim 1, wherein said casing is laterally elongated, and said slot and projection engagement structure is provided in a middle part of each lateral side of said panel opening.

3. An inflatable air bag system according to claim 1, wherein said upper part of said casing is provided with a plurality of resilient leg pieces adapted to be engaged by the peripheral edge of said opening of said panel for allowing said rim to be snap fitted into said opening of said panel.

4. An inflatable air bag system according to claim 3, wherein said leg pieces depend from a lower surface of said peripheral flange portion.

5. An inflatable air bag system according to claim 4, wherein said peripheral edge of said opening of said panel is recessed with respect to said panel so as to present a flush surface when said rim is installed in said opening, and said flange portion is received in said recessed peripheral edge.

6. An inflatable air bag system according to claim 3, wherein said peripheral edge of said opening is provided with a plurality of notches each for receiving a corresponding one of said resilient leg pieces so as to form said slot and projection engagement structure.

7. An inflatable air bag system according to claim 3, wherein said peripheral edge of said opening is provided with a plurality of projections each for engagement with a slot provided in a cooperating one of said resilient leg pieces so as to form said slot and projection engagement structure.

8. An inflatable air bag system according to claim 7, wherein said resilient leg piece is U-shaped, depending from said rim flange portion and said recess is defined by a gap between two prongs of said U-shaped leg piece.

9. An inflatable air bag system according to claim 7, wherein said resilient leg piece is bifurcated, and said recess is defined by a gap between two prongs of said bifurcated leg piece.

10. An inflatable air bag system according to claim 3, wherein an annular rib depends from a lower surface of said flange so as to surround said casing, and a plurality of portions of said annular rib are laterally offset so as to define projections which fit into associated notches provided in said peripheral edge of said opening of said panel to form said slot and projection engagement structure.

* * * * *